April 4, 1950  L. E. S. SMART  2,502,599
SWATH LIFTER AND AERATOR
Filed July 10, 1947  3 Sheets-Sheet 1
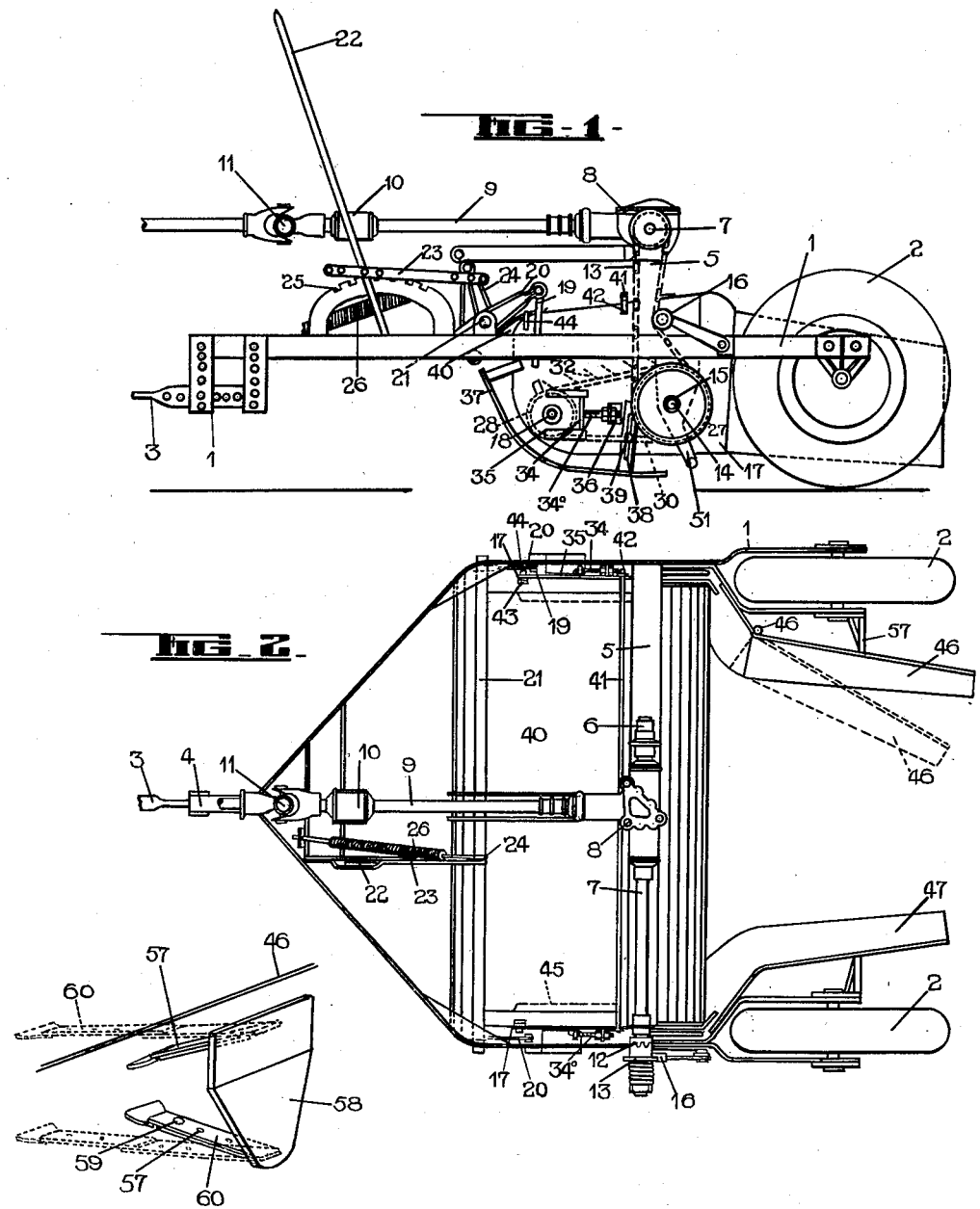
Inventor
L. E. S. Smart April 4, 1950 L. E. S. SMART 2,502,599
SWATH LIFTER AND AERATOR
Filed July 10, 1947 3 Sheets-Sheet 2
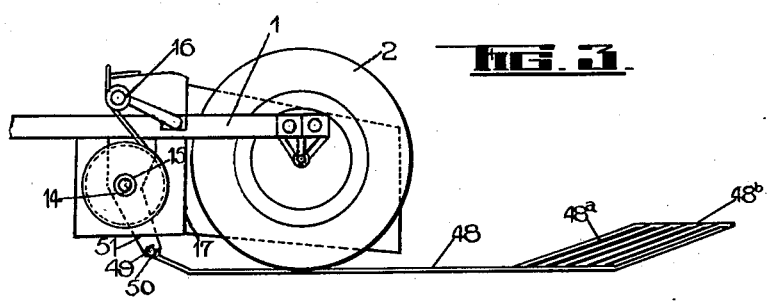
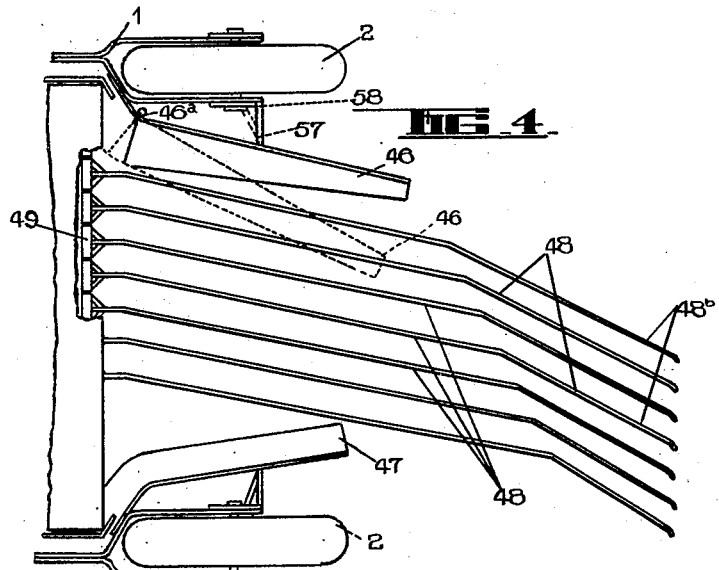
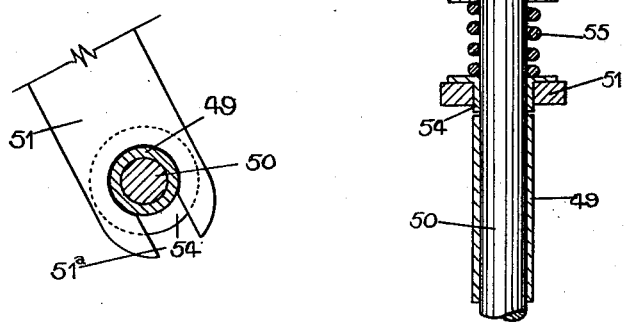
Inventor
L. E. S. Smart

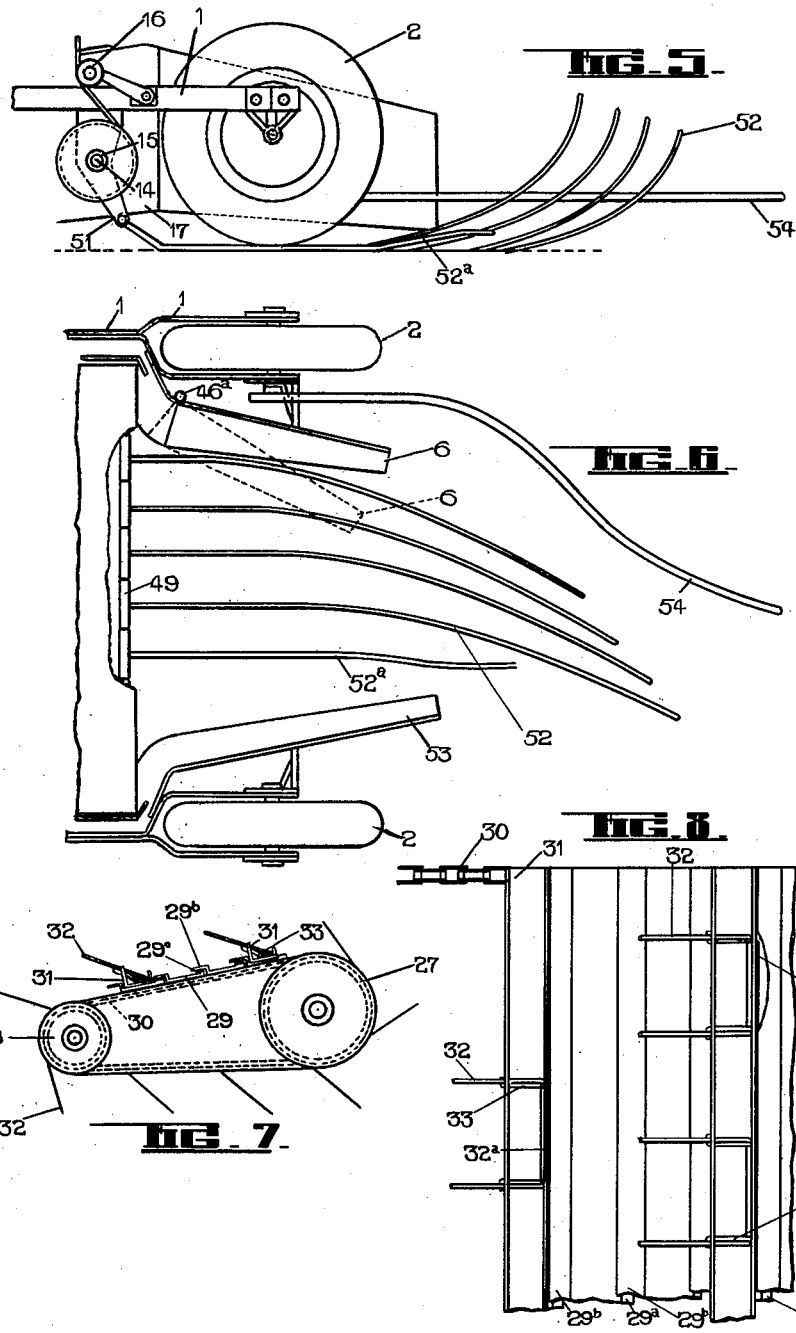

Patented Apr. 4, 1950

2,502,599

UNITED STATES PATENT OFFICE 2,502,599

SWATH LIFTER AND AERATOR

Leonard Edward Stanley Smart, Lincoln, New Zealand, assignor of one-half to Andrews & Beaven Ltd., Christchurch, Canterbury, New Zealand Application July 10, 1947, Serial No. 760,096
In New Zealand March 12, 1946

Section 1, Public Law 690, August 8, 1946
Patent expires March 12, 1966

1 Claim.  (Cl. 56—370)

The invention relates to means for lifting and aerating a windrow or swath, and has for its object, the provision of an improved form of machine, designed particularly to provide for the re-conditioning of any crop which has previously been cut and has deteriorated owing to exposure to wet weather or through other circumstances, by lifting and replacing same on the ground in such a condition and position that free circulation of air through the crop is permitted, and the latter is aerated, and in a comparatively short space of time is in a condition for harvesting, baling or being further handled for some other specific purpose.

The lifting of the crop from the ground is performed by a combing operation, which loosens and opens out the crop to provide for the passage of air through same, and according to the condition of the ground being worked over, and the nature of the crop being dealt with, so is the replacement of the crop on the ground varied to suit the conditions encountered.

For instance, should the crop carry seed which it is desired to recover, it can be lifted, opened out for aeration, and re-deposited on the ground in the same row from which it was lifted, to rest on the stubble and be subjected to aeration, or in the case of a non-seed carrying crop, or a seed carrying crop which will not be unduly adversely affected by movement other than that before mentioned, and the ground from which it was lifted is unduly wet, said crop can be diverted to one side of the row from which it was lifted, so as to be deposited on comparatively dry stubble which facilitates the aerating process, or if desired in the case of a non-seed carrying crop, or in the case of a seed carrying crop which will stand more handling, in addition to that before described, without being unduly adversely affected, the crop can, following the lifting and opening out, be completely turned over before being re-deposited on the ground, or in the case of a crop where retention of colour is desirable, the complete turning over is effected only where the following harvesting or other operation is carried out sufficiently soon enough to avoid harm being done to the crop by further loss of colour.

Generally, the invention envisages the provision of a machine for carrying out the aforesaid operations, which up to the present have been capable of performance only by hand operation as by forking, and the machine to be hereinafter described has been designed primarily to deal with cut crops which may lay loosely on the ground, or which may have become more or less matted, or which may have become overgrown, the two last mentioned conditions making it imperative that while the machine must not be destructive in its action on crops, it must, in order to bring the latter to a condition which will facilitate aeration thereof, be of such form and construction as will overcome the considerable resistance afforded by matted and overgrown crops.

The improved machine provided by the invention is adapted to travel over a cut crop on the ground, for the purpose of loosening or opening out the crop to facilitate its re-conditioning by aeration, and is provided with an endless conveyor pick up, flexible through its length, and fully rigid through its width and also against movement of its sides towards each other, said conveyor comprising flexibly secured together rigid cross bars carrying tines adapted to comb and lift the crop from the ground, and convey it rearwardly of the machine for re-depositing on the ground.

In order, however, that a complete understanding of the invention may be had, a machine in accordance therewith will be described in detail in conjunction with the accompanying drawings wherein:

Figure 1 is an elevation, and

Figure 2 a plan view of the machine, without the attachments for diverting, or for turning a lifted crop, Figures 3 and 4 being a part elevation and part plan view of the machine fitted with the attachment for diverting a lifted crop, in position for use, while Figures 5 and 6 are similar views to Figures 3 and 4, showing the attachment for turning a lifted crop, in position for use, and Figure 7 is a part sectional elevation, and Figure 8 a part view (both enlarged), illustrating the construction of the conveyor pick up, Figure 9 being a detail view in sectional elevation and Figure 10 being a detail view in sectional plan of means for securing the diverting, and the turning attachments to the machine, and for releasing same therefrom, while Figure 11 shows in perspective, adjustable stay means for securing an adjustable shedder board in position.

As illustrated, the machine comprises a main frame 1, provided at its rear with side separately mounted travelling wheels 2, and converging at its front where it is fitted with a draw bar 3 containing a series of holes, and adjustable in guides or brackets 4, also each containing a series of holes, said draw bar 3 providing a hitch for connecting to a tractor or the like, for supporting the front of the machine, and for towing same.

The main frame 1 is formed with cross members 5, one of which extends upwards therefrom and supports bearings 6 for a cross shaft 7 driven through gearing preferably housed in a gear box 8, and a drive shaft 9 which extends forwardly of the machine through a bearing 10 supported from the main frame 1, and contains one or more universal joints 11, and is adapted to be driven from the power take off of a tractor or the like.

From the cross shaft 7 power is transmitted through a safety release clutch 12, and a chain and sprocket drive 13 to a rear rotary cross shaft 14 mounted in bearings 15 which depend from the main frame 1, a jockey pulley 16 mounted on the latter being provided to take up slack in the chain of the chain and sprocket drive 13.

A sub-frame consisting of side plates 17 and a forward rotary cross shaft 18, is adapted to pivot at its rear end on the rear rotary cross shaft 14, the forward end of the sub-frame being suspended by rods 19 attached to the forward ends of the side plates 17, being pivotally connected to the outer ends of side arms 20, secured on a rock shaft 21 mounted across the main frame 1 in advance of the forward rotary shaft 18.

The rock shaft 21 can be operated to cause the forward end of the sub-frame to be raised or lowered on the rear rotary shaft 14, by means of a hand lever 22 mounted on the main frame 1, and connected by a bar 23 with a centre arm 24 secured on said rock shaft 21, the hand lever 22 being provided with a suitable pawl for engaging in a toothed quadrant 25 on the main frame 1, for the purpose of maintaining the forward end of the sub-frame in a selected raised or lowered position.

A spring 26 in tension between the main frame 1 and the outer end of the centre arm 24 on the rock shaft 21, assists the lifting or raising movement of the sub-frame.

A conveyor pick up is adapted to travel around sprocket wheels 27, 28 on the rear and forward rotary shafts 14, 18 respectively, the lower side of the conveyor travelling in a direction forwardly of the machine, and the upper side of said conveyor in a direction rearwardly thereof.

The conveyor pickup is flexible through its length and is fully rigid through its full width, and also against movement of its sides towards each other, and consists of a series of rigid bars 29, preferably of metal, placed closely side by side and secured across spaced chains 30 adapted to pass around the sprocket wheels 27, 28 on the rear and forward rotary cross shafts 14, 18, said bars 29 having a reinforced or thickened leading edge 29a, and a raised lip trailing edge 29b, the latter being adapted to overlap the reinforced or thickened edge 29a of the following bar 29.

Equally spaced around and secured to the conveyor are a number of further cross bars 31 of channel section, the trailing or following side of the channel extending further from the conveyor than the leading side of the channel.

These channel bars 31 are provided to carry the tines 32 which are adapted to comb and pick up the crop as the lower side of the conveyor travels forwardly through same, in the same direction as, but faster than the travel of the machine along the ground.

The tines 32 are formed in pairs, and are joined together at their inner ends, each pair of tines 32 being secured in a channel member 31 to incline therefrom in the opposite direction to the direction of travel of the conveyor, with the connecting portion 32a between the tines 32 located in the channel members 31 adjacent the shallower sides thereof, the tines 32 passing through the deeper sides of the channel members 31, the securing of the tines 32 in the channel members 31 being effected by means of U-shaped wire clips 33 the legs of which are passed inwardly through the shallower walls of the channel members 31, crimped over the connecting portions 32a between the tines 32, and then passed outwardly through the deeper walls of the channel members 31, and bent along the outsides of said deeper walls between the tines 32 and the conveyor.

The tines 32 are equally spaced through the length of the channel members 31, or across the conveyor, and each pair of tines 32 can be expeditiously replaced, as required, without dismantling the conveyor, by merely removing a single clip 33, inserting a new pair of tines 32, and securing a clip 33 in the channel member 31 and over the connecting portion 32a between the tines 32, as before described.

Adjustment of the tension of the chains 30 of the conveyor pick up is provided for, by mounting the bearings for the forward rotary shaft 18 of the conveyor on plates 34 slidable in guides 35 on the side plates 17 of the sub-frame, said side plates 17 being slotted to permit the bearings to slide in same, the adjusting means comprising screws 34a secured to the sliding plates 34, and capable of being operated through, and of being locked to, brackets 36 on the side plates 17 of the sub-frame, by nuts on the screws 34a at each side of the brackets 36.

Of the sprocket wheels 27, 28 around which the chains 30 of the conveyor travel, those on the rear rotary shaft 14 are secured thereon to turn with same, while the sprocket wheels 28 on the forward rotary shaft 18 are loosely mounted thereon.

Side shields 45 which extend in a direction through the length of the machine are secured to the inner surfaces of the side plates 17 of the sub-frame, and cover the ends of the cross bars 29 or the sides of the conveyor.

The forward ends of the side plates 17 of the sub-frame are provided with runners or skids 37, adapted to travel on the ground when the conveyor is lowered for use, said runners or skids 37 being pivotally secured at their upper ends to the side plates 17, and being adjustable towards or from the latter, by means of brackets 38 pivotally attached to the rear end of the runners or skids 37, and slotted to pass upon screwed studs 39 on the side plates 17, so as to enable the runners or skids 37 to be locked in a set position, by nuts placed on studs 39.

The machine is provided with a cowl 40 for the purpose of shielding picked up material from wind, and the latter from interfering with the control of the swath passing over the conveyor pick up, the cowl 40 extending from a point above and forward of the forward rotary shaft 18, to a point above the rear rotary shaft 14, and being secured in position on the upper edges of the side plates 17 of the sub-frame, by a cross rod

41 attached to the cowl 40, being inserted in brackets 42 on the side plates 17, and by brackets 43 on the cowl 40, being secured as by means of bolts to further brackets 44 on the side plates 17.

The foregoing description deals with a machine for combing and picking up a crop, and re-depositing same in the same row from which it was lifted, the crop being combed, and lifted by the tines 32 upwards over the front of the conveyor, to travel rearwards on same and be re-deposited on the stubble or the ground directly behind the machine in a loosened or opened out condition, which facilitates the passage of air through and below the crop, and speeds the drying of same, the width of the windrow following delivery of the loosened or opened out swath from the machine, being regulated by converging shedder boards 46, 47 at the rear of the machine.

When it is desired to deposit the lifted and loosened or opened out swath on ground or stubble to one side of the position from which it was lifted, as for instance on to ground or stubble drier than that from which it was lifted, there is provided a diverting or deflecting attachment (Figs. 3 and 4), to enable this to be done.

The diverting or deflecting attachment comprises a series of spaced rods 48 adapted to be trailed along the ground behind the machine, so as to receive loosened or opened out material passed over the rear of the conveyor pick up, and to deliver said material in a row at or towards one side of the path of travel of the machine.

The rods 48 are provided at their forward ends with fittings 49 adapted to be passed upon a cross rod 50 capable of being secured in brackets 51 which depend from the bearings provided for the rear rotary shaft 14, so as to extend in spaced arrangement rearwardly from and towards one side of the path of travel of the machine, between the converging shedder boards 46, 47, the board 46 at the side of the machine from which the swath is being diverted or deflected, being in this case longer than the other board 47, and being adjustable towards or from the latter.

The adjustable board 46 is hinged at 46ᵃ, so that its rear end can be moved towards or from the other board 47 as required, and is stayed or held in the desired position by extensible and collapsible bars 57, each of which comprises a portion pivotally attached at one end to a bracket 58 on the side frame of the machine, and a portion pivotally attached at one end to the board 46, the two portions being adapted to slide one on the other, and to be locked in an extended or collapsed condition by locating bolts 59 inserted in registering holes 60 in said portions.

The spaced rods 48 are parallel with each other throughout their length, and are each formed with a forward end which inclines rearwards and downwards from the rod 50 to a horizontal portion adapted to travel along on the ground, and which horizontal portion extends rearwardly and towards one side of the path of travel of the machine, and from said horizontal portion the rod is made to incline upwards and rearwards and further to the side of the path of travel of the machine aforesaid, as at 48ᵃ, to terminate in a rearwardly extending horizontal portion 48ᵇ located a distance above the ground.

In the spaced arrangement of the rods 48, the horizontal portions thereof which travel along on the ground, when viewing the arrangement from the side thereof from which the swath is to be diverted, increase in length towards the opposite side, while the upwardly, rearwardly and sidewardly inclined portions 48ᵃ of the rods 48 between the lower horizontal portions and the upper horizontal portions 48ᵇ are all of the same length, and provide a sloping or inclined cross grille formation, which combines with the lower horizontal portions of the rods 48 to effect the side transference of the material over the rear upper horizontal portions 48ᵇ, and the depositing of the material lightly in the new position in a loose or opened out condition, so that air is enabled to pass freely through and aerate same.

The attachment for turning a swath completely over to one side of the machine, comprises a series of bars 52 (Figs. 5 and 6) of flat cross section, adapted to be arranged in spaced arrangement on the cross bar 50 fitted in brackets 51 as in the case of the deflector or diverter rods 48, each bar 52 extending rearwards in and parallel with the path of travel of the machine, and then curving upwards and towards the side of the path of travel of the machine, at which the turn over of the swath is to be effected.

Viewing the spaced arrangement of bars 52 referred to in the last paragraph, from the side of the machine at which the turn over is to be effected, and with the exception of the shorter bar 52ᵃ, at said side, the bars 52 and their straight portions both decrease in length towards the opposite side, while their curved portions are disposed in relation to one another, to approximate a mould board formation which, combined with the shorter bar 52ᵃ and an extended side board 53 at the side of the machine at which the turn over is desired, plus the action of a further horizontal bar 54 which curves from the side of the machine from which the turn over is being effected, to the other side, behind the spaced bars 52, at a short distance from the ground, a complete turn over of the lifted swath is obtained, and the latter is deposited on the ground in a loose and opened out condition for the passage of air through same.

Means for enabling the cross rod 50 with either the diverting or deflecting rods 48, or the turn over bars 52 fitted thereon, to be readily inserted in, or detached from its supporting brackets 51, as required, consist in forming an oversize hole in one of said brackets 51 and slotting the latter as at 51ᵃ, to permit the rod 50 to be passed sideways into or from the oversize hole, a flanged ferrule 54 slidable on the rod 50 being adapted for insertion in said hole to retain the rod 50 therein, a spring 55 in compression between the ferrule 54 and a stop 56 on the rod 50 normally forcing the ferrule 54 along the rod 50 into the hole in the bracket 51.

To detach the rod 50 from the brackets 51, the ferrule 54 is moved along the rod 50 against the action of the spring 55 to allow the rod 50 to drop through the slot 51ᵃ in the bracket 51 and out of the latter, following which the other end of the rod 50 can be withdrawn from its bracket 51.

To insert the rod 50 in the brackets 51, one end of the rod is inserted in the bracket 51 without the slot 51ᵃ therein, and the other end passed sideways through the slotted bracket 51 and the oversize hole therein, after which the ferrule 54 is allowed to slide along the rod 50 into the hole therein under the action of the spring 55, to retain the rod 50 in the slotted bracket 51.

The machine can be constructed as a horse drawn unit with widely spaced apart front wheels to clear the swath, said wheels being part of a swivelling fore-carriage provided with means such as a pole and swingle trees for harnessing horses thereto, the conveyor pick up being driven at a constant speed by an engine mounted on the machine and geared with the upper cross drive shaft.

What I do claim and desire to obtain by Letters Patent of the United States of America is:

In a machine which is movable by a towing means over a surface on which lies material to be tedded, the combination of a wheeled frame; a driven shaft journaled in said frame longitudinally thereof; means for driving said shaft from said towing means; a second driven shaft journaled in said frame transversely thereof; means for driving said second shaft by said first shaft; a second frame pivoted on said second shaft for oscillation about said second shaft; means for oscillating said second frame; a shaft journaled in said second frame; a pair of sprocket-wheels mounted on said second and third mentioned shafts, respectively; a sprocket-chain conveyor trained about said sprocket-wheels; and a plurality of tines mounted on said conveyor, said sprocket-wheels and said conveyor being so related that as the wheeled frame moves forwardly the sprocket wheels move said conveyor and the tines carried thereby in a path forwardly and below said second frame and substantially parallel with said surface to lift the material from the surface and then said conveyor moves rearwardly and above said second frame to convey the material over said second frame and deposit the same on said surface rearwardly of the machine.

LEONARD EDWARD STANLEY SMART.

REFERENCES CITED

The following references are of record in the file of this patent:

UNITED STATES PATENTS

| Number | Name | Date |
|---|---|---|
| 186,346 | Huber et al. | Jan. 16, 1877 |
| 372,344 | Utter | Nov. 1, 1887 |
| 1,748,592 | Wettenkemp | Feb. 25, 1930 |
| 2,318,229 | Jones | May 4, 1943 |